United States Patent
Dong

(10) Patent No.: US 9,008,738 B1
(45) Date of Patent: Apr. 14, 2015

(54) FACILITATING A PAINTING OR A DRAWING ON AN INSERT CARD RETAINED WITHIN OR ON A REAR SURFACE OF A CELL PHONE PROTECTOR CASE

(71) Applicant: Mary Hong Dong, Diamond Bar, CA (US)

(72) Inventor: Mary Hong Dong, Diamond Bar, CA (US)

(73) Assignee: Valor Communication, Inc., City of Industry, CA (US)

( * ) Notice: Subject to any disclaimer, the term of this patent is extended or adjusted under 35 U.S.C. 154(b) by 99 days.

(21) Appl. No.: 13/726,399

(22) Filed: Dec. 24, 2012

(51) Int. Cl.
*H04B 1/00* (2006.01)
*H04M 1/02* (2006.01)
*H01Q 1/24* (2006.01)

(52) U.S. Cl.
CPC .......... *H04M 1/0202* (2013.01); *H04B 1/3888* (2013.01); *H01Q 1/243* (2013.01)

(58) Field of Classification Search
CPC .... H04B 1/3888; H01Q 1/243; H04M 1/0214
USPC .................................. 455/575.8, 575.1, 90.3
See application file for complete search history.

(56) References Cited

U.S. PATENT DOCUMENTS

| | | | |
|---|---|---|---|
| 6,910,718 B2 | 6/2005 | Chareas et al. | |
| 7,206,618 B2 | 4/2007 | Latto et al. | |
| 8,110,268 B2 | 2/2012 | Gegemier | |
| 8,261,195 B2 | 9/2012 | Buehler et al. | |
| 2006/0023872 A1 | 2/2006 | Chang | |
| 2006/0040081 A1 | 2/2006 | Hodsdon et al. | |
| 2006/0188668 A1 | 8/2006 | Wahba | |
| 2013/0079067 A1* | 3/2013 | Peng | 455/575.1 |
| 2013/0122960 A1* | 5/2013 | Kim et al. | 455/566 |
| 2014/0028162 A1* | 1/2014 | Carlson | 312/223.1 |
| 2014/0055978 A1* | 2/2014 | Gantz et al. | 362/8 |
| 2014/0091689 A1* | 4/2014 | Mishan et al. | 312/237 |

FOREIGN PATENT DOCUMENTS

CN  2629358 Y  7/2004

* cited by examiner

*Primary Examiner* — Danh Lee
(74) *Attorney, Agent, or Firm* — Thomas I. Rozsa

(57) ABSTRACT

A cell phone protector case including a front cavity to retain a cell phone. It further includes a rear recessed cavity having a recessed rear wall surrounded by a circumferential rim including a first sidewall, a second sidewall, a first width-wise wall and a second width-wise wall, the recessed rear wall having a width-wise dimension and a lengthwise dimension and extends for a depth "below the tops of the respective lengthwise sidewalls and the width-wise walls. A key unique feature is the inclusion of a sheet of drawing, sketching or artwork paper having a front surface and a rear surface dimensioned to fit within the rear recessed cavity and retained by the rear sidewalls and rear width-wise walls.

3 Claims, 10 Drawing Sheets

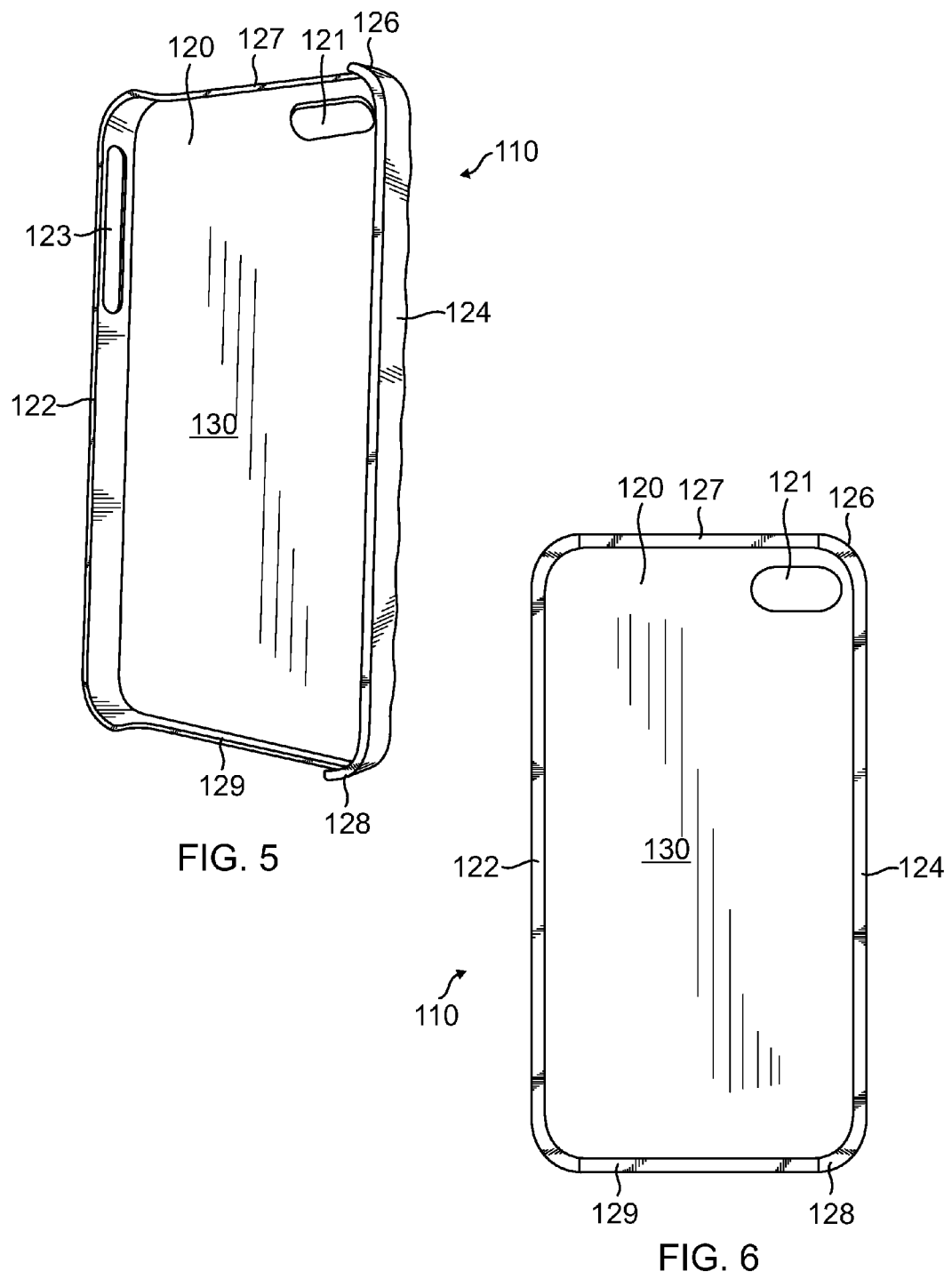

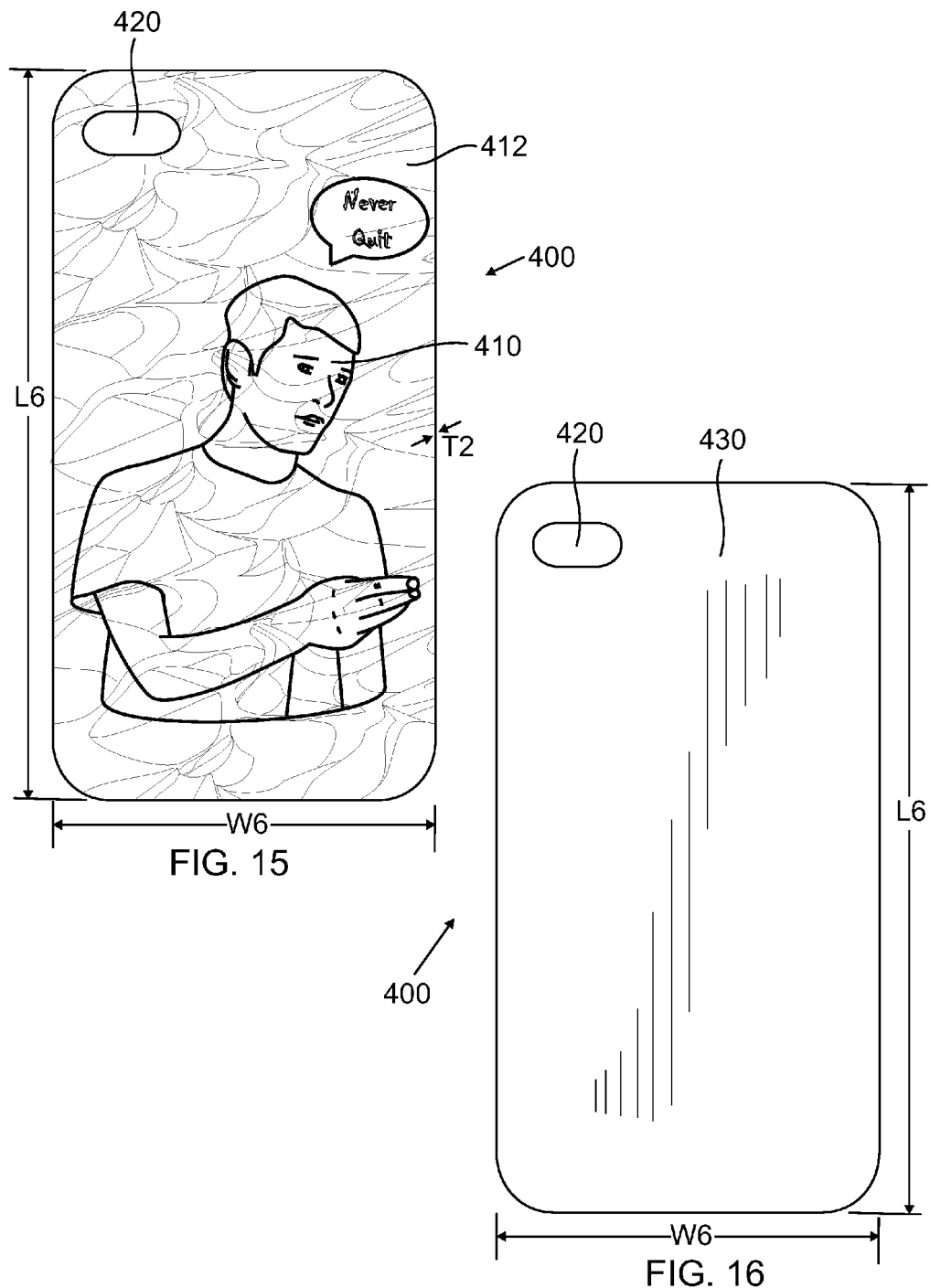

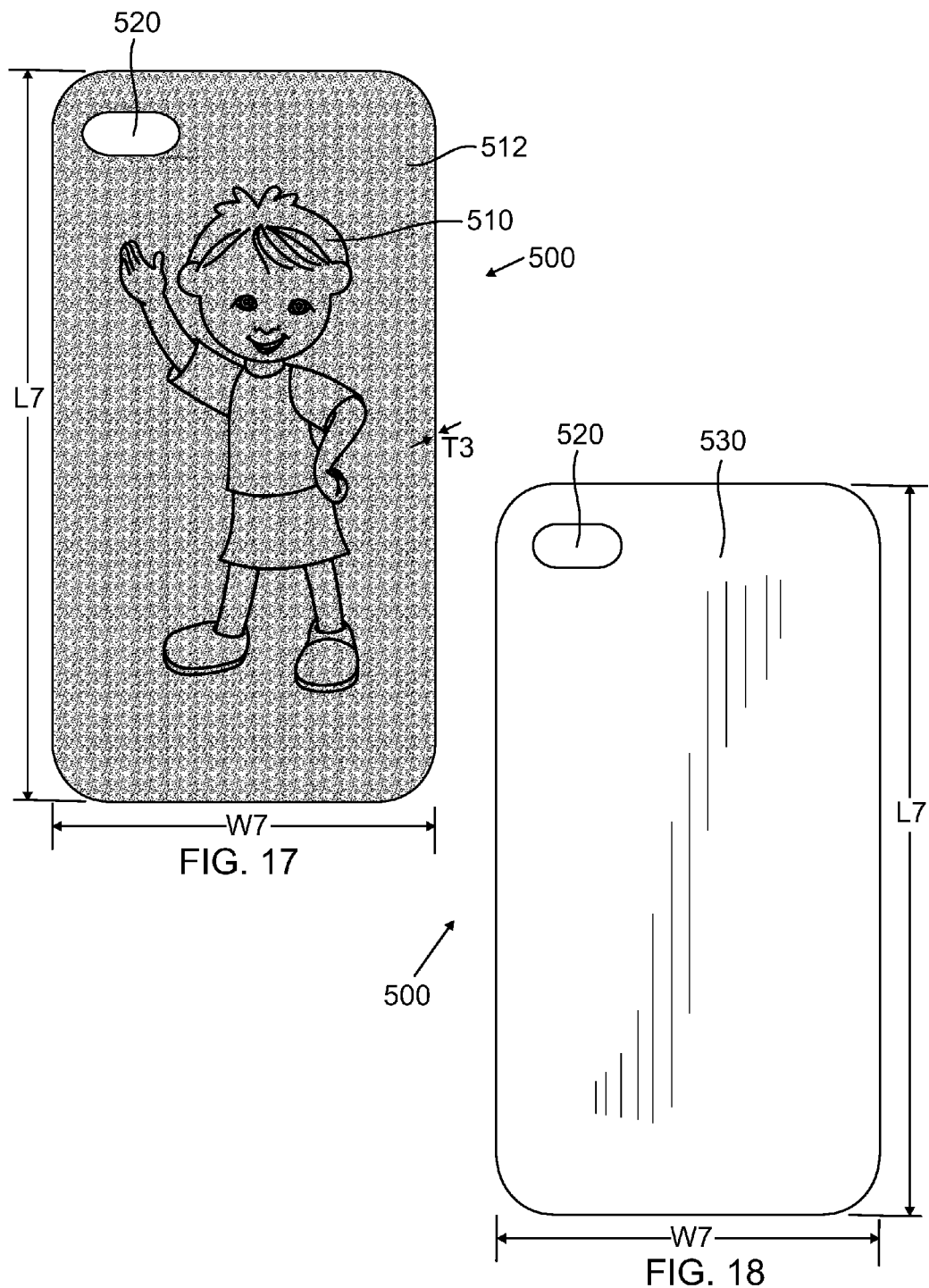

FACILITATING A PAINTING OR A DRAWING ON AN INSERT CARD RETAINED WITHIN OR ON A REAR SURFACE OF A CELL PHONE PROTECTOR CASE

BACKGROUND OF THE INVENTION

1. Field of the Invention

The present invention relates to the field of decorative accessories used in conjunction with cell phone protector cases to make the case more attractive and pleasing to the owner.

2. Description of the Prior Art

The following eight patents and published patent applications are relevant to the present invention:
1. U.S. Pat. No. 6,910,718 issued to Nick Chareas et al. on Jun. 28, 2005 for "Writing Pad For Cellphone" (hereafter the "Chareas Patent");
2. United States Published Patent Application No. 2006/0023872 to Richard Chang on Feb. 2, 2006 for "Portable Electronic Device Customization Kit" (hereafter the "Chang Published Patent Application");
3. United States Published Patent Application No. 2006/0040081 to Jerry Grant Hodsdon et al. on Feb. 23, 2006 for "Apparatus, System, And Method For Personalizing A Portable Electronic Device" (hereafter the "Hodson Published Patent Application");
4. United States Published Patent Application No. 2006/0188668 to Sol Wahba on Aug. 24, 2006 for "Decorative Attachment For Personal Property" (hereafter the "Wahba Published Patent Application");
5. U.S. Pat. No. 7,206,618 issued to Antonio T. Latto et al. on Apr. 17, 2007 for "Removable Customizable Inserts And Faceplate For Electronic Devices" (hereafter the "Latto Patent");
6. U.S. Pat. No. 8,110,268 issued to Darrin G. Gegemier on Feb. 7, 2012 for "Adhesive Cover For Consumer Devices" (hereafter the "Hegemier Patent");
7. U.S. Pat. No. 8,261,195 issued to Doyle Buehler et al. on Sep. 4, 2012 for "Method For Customizing A Cover For Electronic Device" (hereafter the "Buehler Patent");
8. Chinese Patent No. CN2629358Y issued to Wang Kaiyi on Jul. 28, 2004 for "Cultural Mobile Phone" (hereafter the "Kaiyi Chinese Patent").

The Chareas Patent discloses a writing pad for cell phones. Specifically, the patent discloses:

"A writing pad attachment for a cellular phone or other handheld electronic device, having a housing, an adjustable writing surface, a marking pad and a writing implement. The housing is releasably attached to the back of a cellular phone. The adjustable writing surface is located inside of the housing and is slidably adjusted to a locked position outside of the housing to provide a sturdy writing surface. Alternatively, the adjustable writing surface may be released from the housing and placed in a more convenient location. The adjustable writing surface is either a tray or a flat slate. The housing may be detached from the back of the cellular phone to provide a more convenient writing surface for the user. The writing pad attachment also provides a locking mechanism for securing the adjustable writing surface in a desired position."

In this case, the concept is to have an external support tray mechanism 10 which is affixed to the back of the cell phone protector case and has an entrance where a person can slidably remove a pad on which to write. It does not discuss the concept of painting but it does discuss the concept of having a marking method but it is different from the present invention in that it is really not integrated into the cell phone protector case and it is primarily put on the back of a flip phone and further is designed more for writing messages or information rather than a painting, sketch or drawing.

The Chang Published Patent Application discloses a portable electronic device customization kit. Specifically, the patent application discloses:

"A kit for personalizing a portable electronic device and for protecting it from scratches. This kit comprises several decal sheets each one comprising in a sandwich, a) a decorative layer, having a top side and a bottom side, the top side displaying decorative or artistic patterns, and the bottom side coated with a strong adhesive; b) a waxy layer applied to the bottom side of the decorative layer and covering the strong adhesive. Each decal sheet is cut to fit an area of the electronic device such as not to cover the electronic device's functional parts. Just prior application of decal sheets to the electronic device the waxy layer is removed from the decal sheets."

In this case, the concept is to make a decal sheet which is affixed to the cell phone protector ease, the decal having various ornamentation on it.

The Hodson Published Patent Application discloses the concept of having a printable decorative sheet which has a preprinted decoration on it and it is affixed by adhesive to the back of the cell phone protector case.

Specifically, the patent application discloses:

"The user can purchase a printable sheet, select a desired pattern, print the desired pattern onto the face layer of the printable sheet, peel the label portion or portions from the printable sheet, remove the cover or covers from the desired device, place the labels between the cover and the device, and re-secure the cover to the device. When the user decides to change the desired pattern, the user can print another desired pattern onto the face lay of a printable sheet and repeat the process. The user can print the desired pattern in various ways, including by hand, via a computer printer, etc. The printable sheet can also be preprinted with a pattern by the manufacturer. The invention may be used with various types of print media that may be used for the printable sheet. One type of print media may be a spot metallic print media that has a printable coating that becomes transparent when printed with inkjet inks."

The Wahba Published Patent Application discloses a decorative attachment to a cell phone protector case. In this case, the decorative attachment is attached by various attaching means. It is primarily a multiplicity of dots that have various configurations on it.

The Latto Patent discloses a removable customizable insert and faceplate for electronic devices. Specifically, the patent discloses:

"A method and apparatus is disclosed for the customization of electronic equipment of which portable audio players, portable disc players, portable digital games and laptop computers are representative. The electronic equipment may be fitted with a substantially transparent faceplate that may cover removable inserts. These inserts may be customizable to provide unique decorative appearances to the electronic equipment upon which they may be fitted. Decorative designs may either be preprinted on the inserts or a user may produce a customized design."

Claim 1 of this patent reads as follows:

"An electronic device comprising: a base having a first surface; a substantially transparent removable faceplate coupled to the base and covering substantially all of the first surface; and a replaceable ornamental insert positionable between the removable faceplate and the first surface of the base such that a portion of the ornamental insert is viewable through the substantially transparent section, said ornamental insert punched out of a sheet of paper after a user of the electronic device has printed an ornamental design thereon."

The key limitation in this claim is that the ornamental insert which is inserted into the cell phone is punched out of a sheet of paper after a user of the electronic device has printed an ornamental design thereon.

The Hegemier Patent discloses an adhesive cover for consumer devices. It discloses:

"A personalized adhesive cover for a consumer device includes multiple layers. In one implementation, an adhesive cover includes a top laminate layer adhered to a base layer that is adhered to a bottom adhesive layer. The base layer is treated to facilitate acceptance of a personalized design applied to the middle layer. The adhesive cover is contoured to partially or completely cover one or more sides of a consumer device. The cover can include one or more separate pieces, apertures and cutouts, for example, so that the cover does not interfere with the functions of a device."

The patent effectively discloses the concept of having any type of design. Specifically, Column 4 Line 55 to the bottom states:

"As described with reference to FIG. 2, in accordance with various embodiments of the present inventions, adhesive covers may be customized or personalized by including one or more designs. As used herein, the term "design" refers to colors, text, names, company brands, slogans, images, patterns, designs, graphics, photographs, logos, advertisements, or any combination thereof. Designs may be provided by a customer or person who wishes to customize an electronic device or may be provided by a manufacturer of the adhesive cover or other entity. Any suitable method of transferring designs to the adhesive cover may be employed, e.g. printing, screen printing, silk screening, flocking, chemically burning, etc."

The key here is that the cover is adhered to the cell phone protector case as an adhesive cover for covering a surface of a device.

The Buehler Patent discloses a method for customizing a cover for an electronic device. It discloses:

"A method and system for customizing a cover for an electronic device is provided. A plurality of templates associated with a plurality of electronic devices are provided. A client may select a template. The client may create and edit images on the template associated with a model of an electronic device. The method including printing or manufacturing the customized cover using the template."

Claim 1 of the Buehler Patent reads as follows:

"A method of customizing a cover for a surface of a mobile electronic device, the mobile electronic device having a display screen, the method to occur post manufacturing of the mobile electronic device, the method comprising: at a server, providing an interactive web-based customization tool to a client through a network, the interactive web-based customization tool configured to allow a user at the client to: display a template associated with a user selected mobile electronic device selected by the user from a plurality of different mobile electronic devices, the template corresponding to dimensions of the surface of the user selected mobile electronic device and including one or more than one section, each section defining an opening of the cover or a transparent part of the cover; and create an image on the template based on a user-provided photographic image, user-provided image positioning and user-provided image sizing to produce a customized cover, and printing or manufacturing the customized cover post manufacturing by a party other than the manufacturer of the mobile electronic device, such that the image does not cover the opening of the cover or the transparent part of the cover."

The Kaiyi Chinese Patent discloses:

"The utility model discloses a cultural mobile phone consisting of a mobile phone cover (1), painting and calligraphy (2) and a mobile phone body (3). The mobile phone cover (1) consists of an upper layer and a lower layer, the lower layer consists of the functional elements, the upper layer is made of transparent material, and the inner surface of the upper layer of the mobile phone has painting and calligraphy (2). Being provided with painting and calligraphy, the cultural grade is enhanced, which endows the mobile phone with appreciation, commemoration and collecting value, and further illustrating the individualization characteristics of the mobile phone.

This utility model involves having the mobile phone of covers, especially involve one in culture mobile phone with work of calligraphy and painting in the cover.

The cover of the existing mobile phone generally only protects the display screen and makes the key set not touched etc. and act on by foreign object, ornamental individualization is not strong. This utility model offers a kind of improved culture mobile phone, the cover of this kind of culture mobile phone is except that function of keeping the existing mobile phone cover, also have value of art appreciation and commemorate, collect the meaning, make the mobile phone become a kind of individualized work of art.

The stated improved culture mobile phone of this utility model is and adhere to a upper strata of cover by the organism 3 of the mobile phone, cover 1 the works 2 of external calligraphy and painting make up. The cover 1 of the mobile phone is formed by two stories, the lower floor is made up of functional assembly of the mobile phone, the upper strata are made of apparent material, make works of calligraphy and painting on the interior surface of the apparent material directly, it can be handwritten hand drawing, also can print, and the computer makes etc. Upper and lower connections of layer can make into connecting removably, can't also join."

In this ease, the decorative design is directly on the cell phone.

There is a significant need for an improved method to decorate a cell phone protector case with interchangeable artwork created by the cell phone case owner.

SUMMARY OF THE INVENTION

The present invention is the concept of enabling an individual to paint their own drawing or own artwork onto a small canvas which is designed to conform to the shape of the cell phone protector case including openings so that it will not block cameras and other operating equipment. Essentially the concept is to have a piece of canvas paper which is inserted in the clear or transparent frame of a cell phone protector case where the canvas paper is visible from the outside. The canvas can then be painted on or other artwork applied so that the individual has their own unique design on the back of their cell phone protector case. Alternatively, the sheet of paper is affixed to the back of the cell phone protector case and then locked in place with a perimeter locking mechanism so that the sheet is not necessarily protected by a plastic or clear translucent film but the individual is able to touch the picture but it is clear and bright in the back of the cell phone protector.

It is an object of the present invention to provide a purchaser of a cell phone protector case with a kit which enables the owner to draw, sketch, paint or just create the owner's own artwork or design on an insert which can be removably affixed to the back of the cell phone protector case so that the owner can have any multiplicity of designs depending on what the owner is wearing, where the owner is going, or just for fun to have a variety of artwork covers. The cell phone protector case itself is designed to accommodate any model of cell phone which includes any model of smart phone and comparably shaped cell phones which are retained within the cell phone protector cover. The cell phone protector cover will also have openings to accommodate cameras and various other accessories which are required to operate the cell phone. The insert may also have an opening to accommodate the camera accessories from the cell phone.

It is an additional object of the present invention to provide a multiplicity of drawing, sketching and artwork surfaces selected from the group consisting of canvas, canvas paper, watercolor paper, sketch paper, and any other surface which artwork can be affixed by sketching, drawing and artwork affixing means selected form the group consisting of pencil, graphite, colored pencil, crayon, ink pen, fountain pen, and paint brush for both watercolor and oil.

It is another object of the present invention to enable an individual to paint their own drawing or own artwork onto a small canvas which is designed to conform to the shape of the cell phone protector case including openings so that it will not block cameras and other operating equipment.

It is a further objet of the present invention to have a piece of canvas paper which is inserted in a clear or transparent frame of a cell phone protector case where the canvas paper is visible from the outside. The canvas can then be painted on or other artwork applied so that the individual has their own unique design on the back of their cell phone protector case.

It is additionally an object of the present invention to provide a sheet of paper, canvas, etc. which is affixed to the back of the cell phone protector case and then locked in place with a perimeter locking mechanism so that the sheet is not necessarily protected by a plastic or clear translucent film but the individual is able to touch the picture but it is clear and bright in the back of the cell phone protector. The sketch, artwork etc, is previously painted on the paper before it is affixed to the cell phone protector case.

Alternatively, the sheet of paper can be affixed to the cell phone protector case and then the sketch, artwork etc. is applied to the sheet of paper, canvas, etc.

It is additionally an object of the present invention to provide a cell phone protector case may be any color or multiplicity of different color such as black or white.

It is also an object of the present invention to have a cell phone protector case with a recessed rear surface surrounded by a locking border on at least some of its lengthwise and width-wise sides to enable the drawing, sketching or artwork surface to be removably retained onto the recessed surface and retained in place by the locking borders. In this way, the surface can be interchanged with multiple other surfaces having different drawings, sketches and artwork thereon.

It is also an object of the present invention to have a cell phone protector case with a rear surface aligned with the exterior border and a locking mechanism to removably lock the drawing, sketching or artwork surface onto the rear surface. In this way, the surface can be interchanged with multiple other surfaces having different drawings, sketches and artwork thereon.

It is additionally an object of the present invention to have the case made out of hard plastic or comparable material.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 5 is a is a front perspective view of an alternative embodiment of a cell phone protector case of the present invention for use with an iPhone® 4 or iPhone® 4S;

FIG. 6 is a front elevational view of the alternative embodiment of the cell phone protector case illustrated in FIG. 5;

FIG. 15 is a front elevational view of a watercolor paper insert used with the present invention cell phone protector case, with a watercolor drawing thereon;

FIG. 16 is a rear elevational view of the watercolor paper illustrated in FIG. 15;

FIG. 17 is a front elevational view of a canvas paper insert used with the present invention cell phone protector case, with a painting sketch thereon;

FIG. 18 is a rear elevational view of the canvas paper illustrated in FIG. 17;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
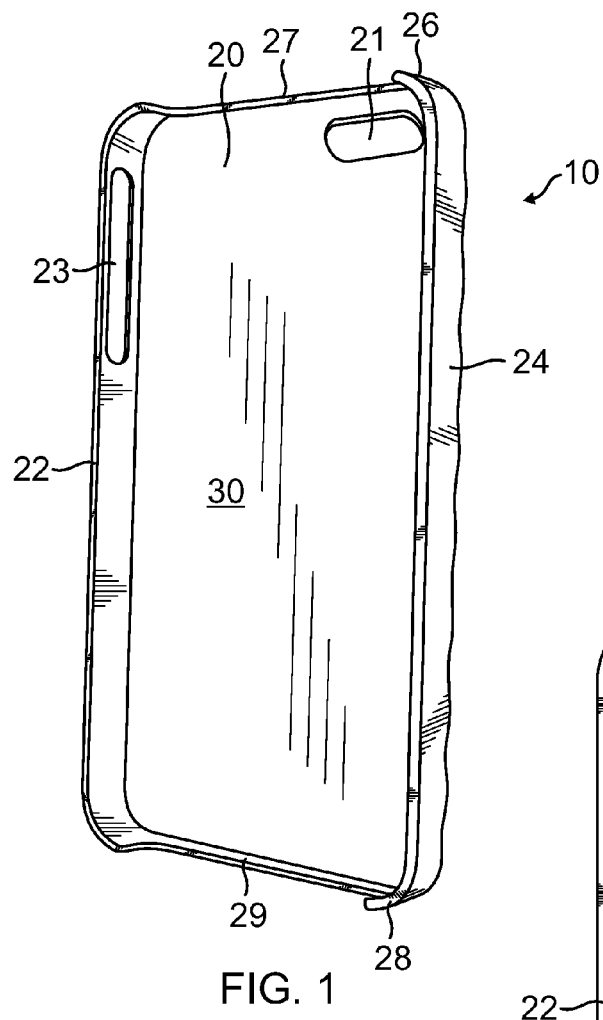
FIG. 1 is a is a front perspective view of one embodiment of a cell phone protector case of the present invention for use with an iPhone® 4 or IPhone® 4S.
Figure 2:
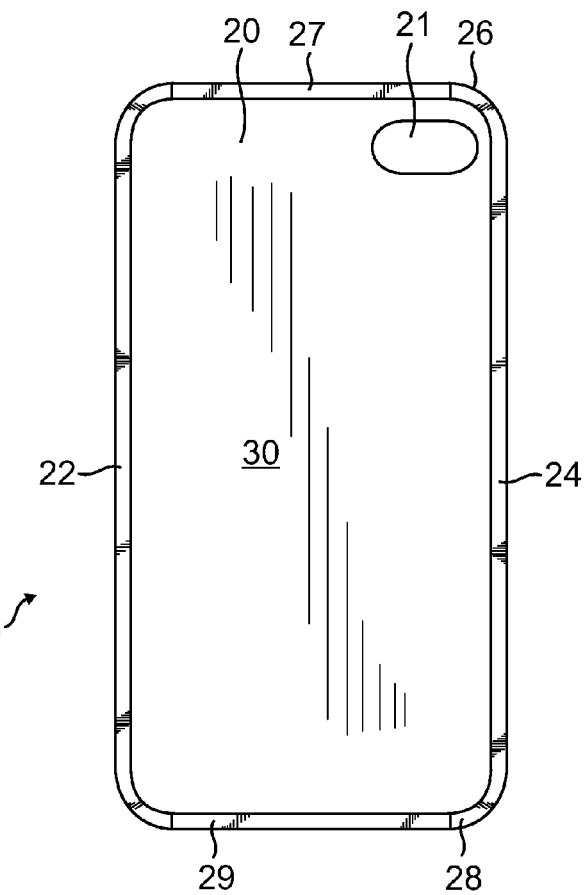
FIG. 2 is a front elevational view of the embodiment of the cell phone protector case illustrated in FIG. 1.

Referring respectively to FIGS. 1 and 2, there is illustrated a front perspective view of one embodiment of a cell phone protector case of the present invention for use with an iPhone® 4 or iPhone® 4S and a front elevational view of the embodiment of the cell phone protector case The cell phone protector case 10 comprises a front interior wall 20 having an opening 21 with a first sidewall 22 having an opening 23 and a second sidewall 24, a short first width-wise wall 26 with an opening 27 and a second width-wise wall 28 with an opening 29. The front interior wall 10, sidewalls 22 and 24 and widthwise walls 26 and 28 surround a cavity 30 to retain a cell phone. The openings 21, 23, 27 and 29 accommodate operating elements of the cell phone. By way of example, the opening 21 is used to accommodate the camera portion of the cell phone.

Figure 3:
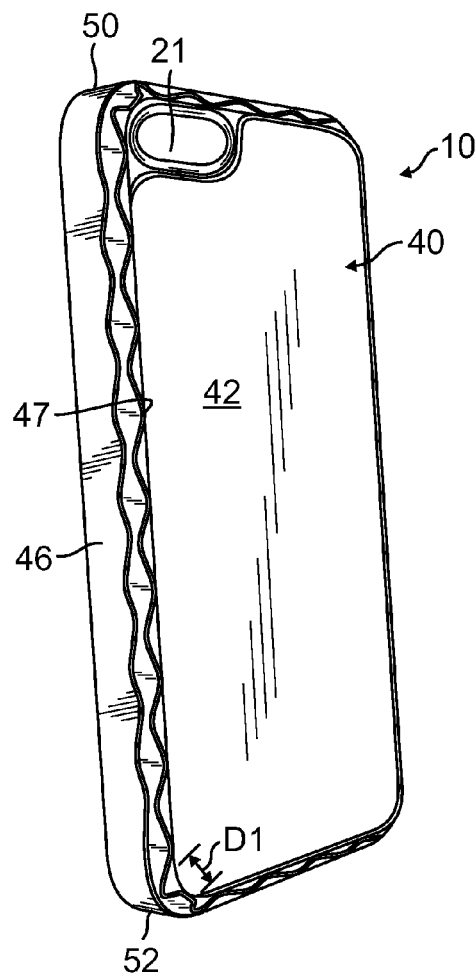
FIG. 3 is a rear perspective view of one embodiment of a cell phone protector ease of the present invention for use with an iPhone® 4 or iPhone® 4S.
Figure 4:
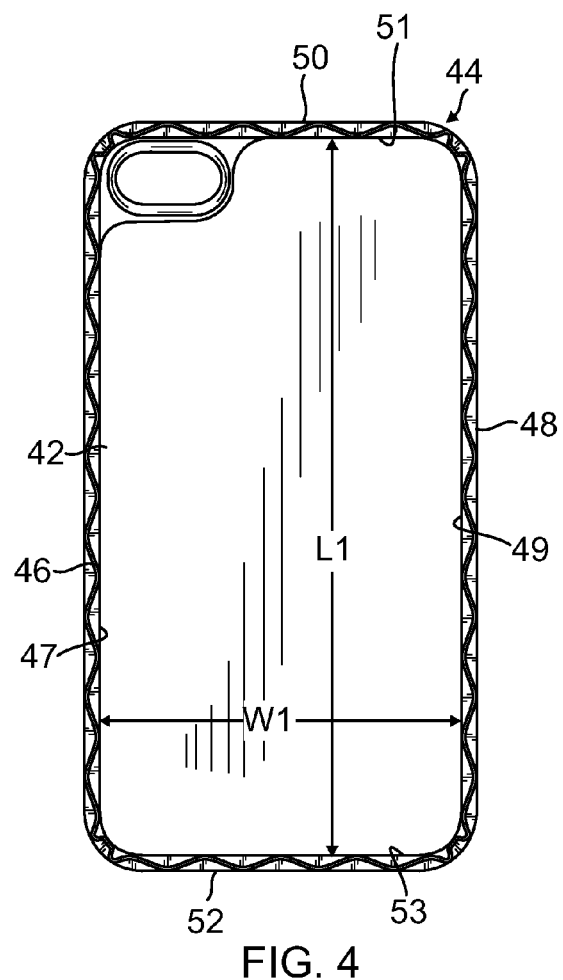
FIG. 4 is a rear elevational view of the embodiment of the cell phone protector case illustrated in FIG. 3.

Referring to FIGS. 3 and 4, there is respectively illustrated a rear perspective view of one embodiment of a cell phone protector case of the present invention for use with an iPhone® 4 or iPhone® 4S and a rear elevational view of the embodiment of the cell phone protector case. The rear 40 of case 10 includes a recessed rear wall 42 surrounded by a circumferential rim 44 including a first sidewall 46, a second sidewall 48 a first width-wise wall 50 and a second widthwise wall 52. The opening 21 extends through rear surface 40. The recessed interior surface 40 has a width-wise dimension "W1" extending the interior 47 of first sidewall 46 to the interior 49 of second sidewall 48 and a lengthwise dimension "L1" extending from interior 51 of first width-wise wall 50 to the interior 53 of second width-wise wall 52, and extends for the depth "D1" below the tops of the respective lengthwise sidewalls 46 and 48 and the width-wise walls 50 and 52.

The alternative embodiment illustrated in FIGS. 5 through 8 is the same as the first embodiment except the rear wall is not recessed.

Referring respectively to FIGS. 5 and 6, there is illustrated a front perspective view of the alternative embodiment of a cell phone protector case of the present invention for use with an iPhone® 4 or iPhone® 4S and a front elevational view of the alternative embodiment of the cell phone protector case. The cell phone protector case 110 comprises a front interior wall 120 having an opening 121 with a first sidewall 122 having an opening 123 and a second sidewall 124, a short first width-wise wall 126 with an opening 127 and a second widthwise wall 128 with an opening 129. The front interior wall 110, sidewalls 122 and 124 and width-wise walls 126 and 128 surround a cavity 130 to retain a cell phone. The openings 121, 123, 127 and 129 accommodate operating elements of the cell phone. The opening 121 is used to accommodate the camera accessory of a cell phone.

Figure 7:
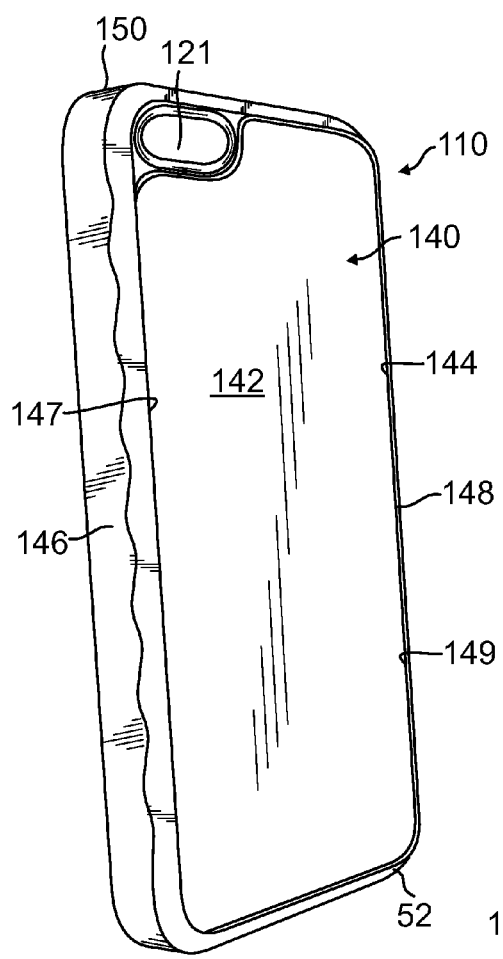
FIG. 7 is a rear perspective view of the alternative embodiment of a cell phone protector case of the present invention for use with an iPhone® 4 or iPhone® 4S.
Figure 8:
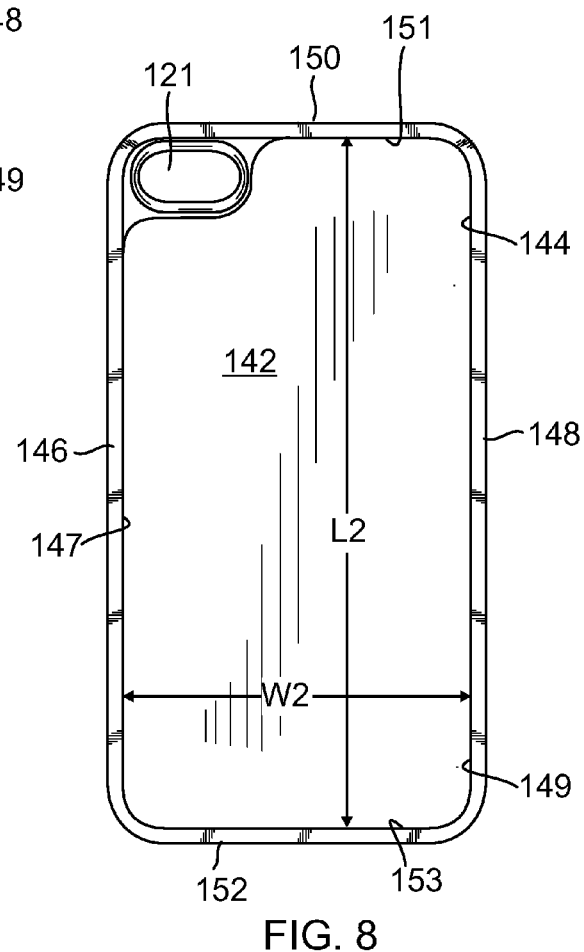
FIG. 8 is a rear elevational view of the alternative embodiment of the cell phone protector case illustrated in FIG. 7.

Referring to FIGS. 7 and 8, there is respectively illustrated a rear perspective view of the alternative embodiment of a cell phone protector case of the present invention for use with an iPhone® 4 or iPhone® 4S and a rear elevational view of the alternative of the cell phone protector case. The rear 140 of case 110 includes a rear wall 142 surrounded by a circumferential rim 144 including a first sidewall 146, a second sidewall 148 a first width-wise wall 150 and a second width-wise wall 152. The opening 121 extends through rear surface 140. The rear wall 142 has a width-wise dimension "W3" extending from the interior 147 of first sidewall 146 to the interior 149 of second sidewall 148 and a lengthwise dimension "L3" extending from the interior 151 of first width-wise wall 150 to the interior 153 of second width-wise wall 152.

Figure 9:
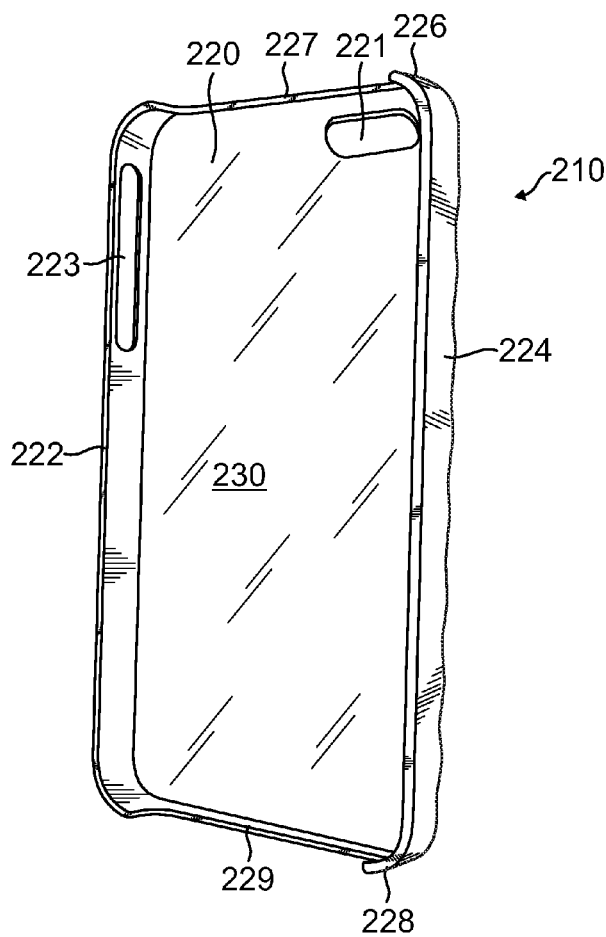
FIG. 9 is a front perspective view of a snap-on transparent cover used with the alternative embodiment of the cell phone protector case illustrated in FIGS. 5-8.
Figure 10:
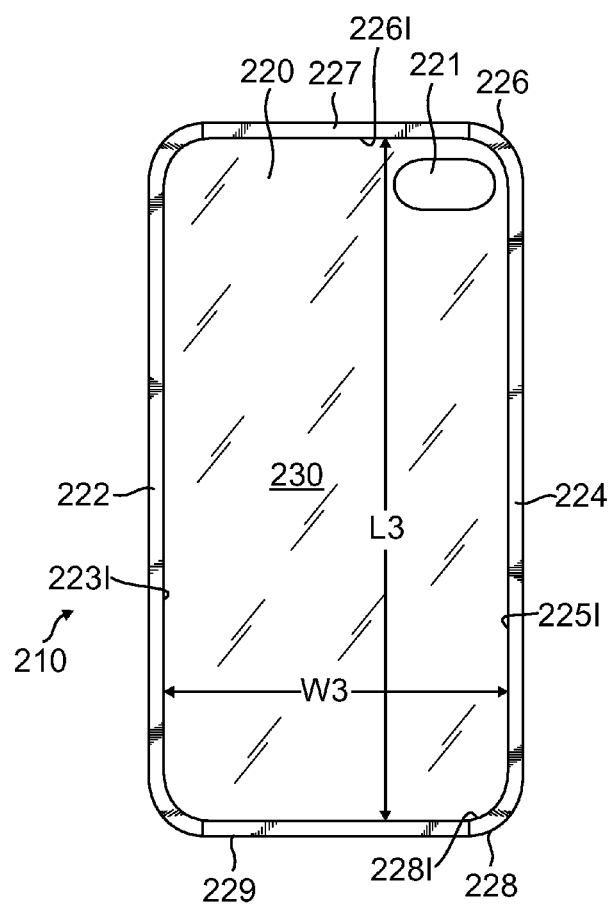
FIG. 10 is a front elevational view of a snap-on transparent cover used with the alternative embodiment of the cell phone protector case illustrated in FIGS. 5-8.

Referring to FIGS. 9 and 10, there is illustrated a front perspective view of the snap-on transparent cover used with the alternative embodiment of the cell phone protector case illustrated in FIGS. 5-8, and FIG. 10 is a front elevational view of the snap-on transparent cover used with the alternative of cell phone protector ease illustrated in FIGS. 5-8. The interior cavity 230 has a width-wise dimension "W3" extending the interior 223I of first sidewall 222 to the interior 224I of second sidewall 224 and a lengthwise dimension "L3" extending from interior 226I of first widthwise wall 226 to the interior 228I of second width-wise wall 228, and is dimension to be a press fit over second alternative embodiment case 110.0, there is respectively illustrated a front elevational perspective view of a snap-on transparent cover used with the alternative embodiment of the cell phone protector case illustrated in FIGS. 5-8, and a front perspective view of a snap-on transparent cover used.

The snap-on cover 210 comprises a front interior wall 220 having an opening 221 with a first sidewall 222 having an opening 223 and a second sidewall 224, a short first widthwise wall 226 with an opening 227 and a second width-wise wall 228 with an opening 229. The front interior wall 210, sidewalls 222 and 224 and width-wise walls 226 and 228 surround a cavity 230 to retain the alternative embodiment 110 of the cell phone protector case. The openings 221, 123, 227 and 229 accommodate operating elements of the cell phone, The interior cavity 230 has a width-wise dimension "W3" extending the interior 223I of first sidewall 222 to the interior 224I of second sidewall 224 and a lengthwise dimension "L3" extending from interior 225I of first width-wise wall 226 to the interior 228I of second width-wise wall 228, and is dimension to be a press fit over second alternative embodiment case 110.

Figure 11:
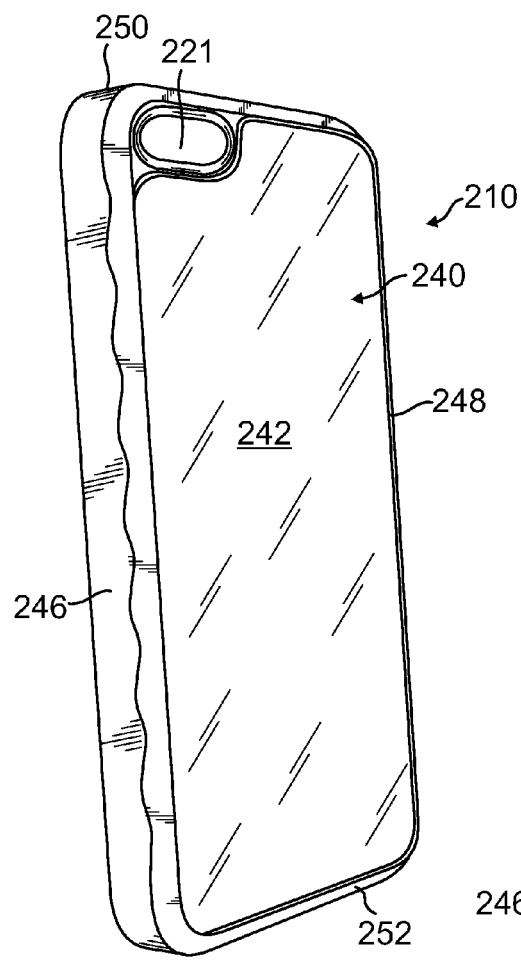
FIG. 11 is a rear perspective view of a snap-on transparent cover used with the alternative embodiment of the cell phone protector case illustrated in FIGS. 5-8.
Figure 12:
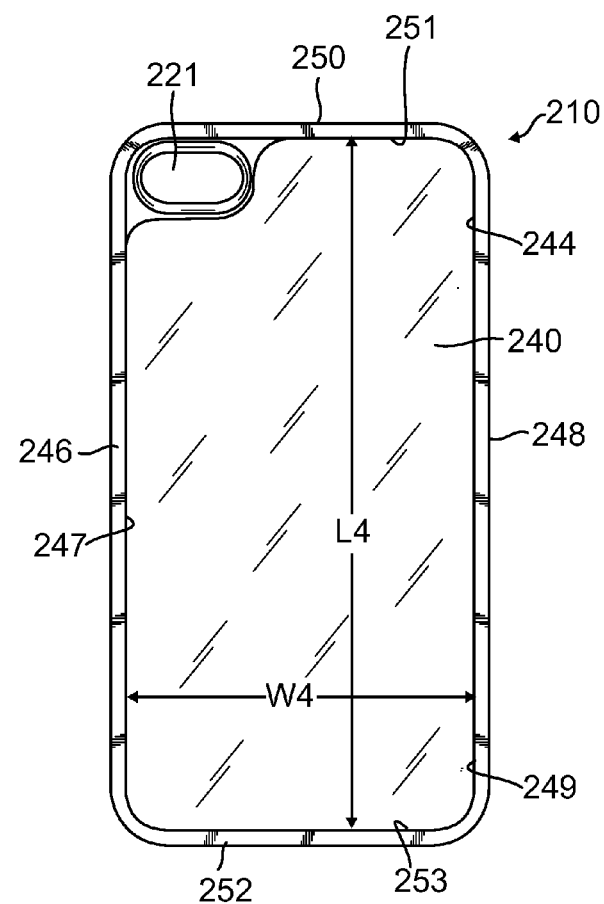
FIG. 12 is a rear elevational view of a snap-on transparent cover used with the alternative embodiment of the cell phone protector case illustrated in FIGS. 5-8.

Referring to FIGS. 11 and 12, there is illustrated a rear perspective view of a snap-on transparent cover used with the alternative embodiment of the cell phone protector case illustrated in FIGS. 5-8, and a rear elevational view of a snap-on transparent cover used with the alternative embodiment of the cell phone protector ease illustrated in FIGS. 5-8.

The rear 240 of the snap-on case 210 includes a rear wall 242 surrounded by a circumferential rim 244 including a first sidewall 246, a second sidewall 248 a first width-wise wall 250 and a second width-wise wall 252. The opening 121 extends through rear surface 240. The rear surface 240 has a width-wise dimension "W4" extending the interior 247 of first sidewall 246 to the interior 249 of second sidewall 248 and a lengthwise dimension "L4" extending from interior 251 of first width-wise wall 250 to the interior 253 of second width-wise wall 252, and is approximately level with the respective lengthwise sidewalls 246 and 248 and the widthwise walls 250 and 252. The snap-on cover is dimensioned so that its interior front cavity 230 receives the entire alternative embodiment 110 within it so that the rear surface 142 is aligned with front surface 230 so that the snap-on cover 210 press fit retains the alternative embodiment 110 within it.

Figures 13, 14:
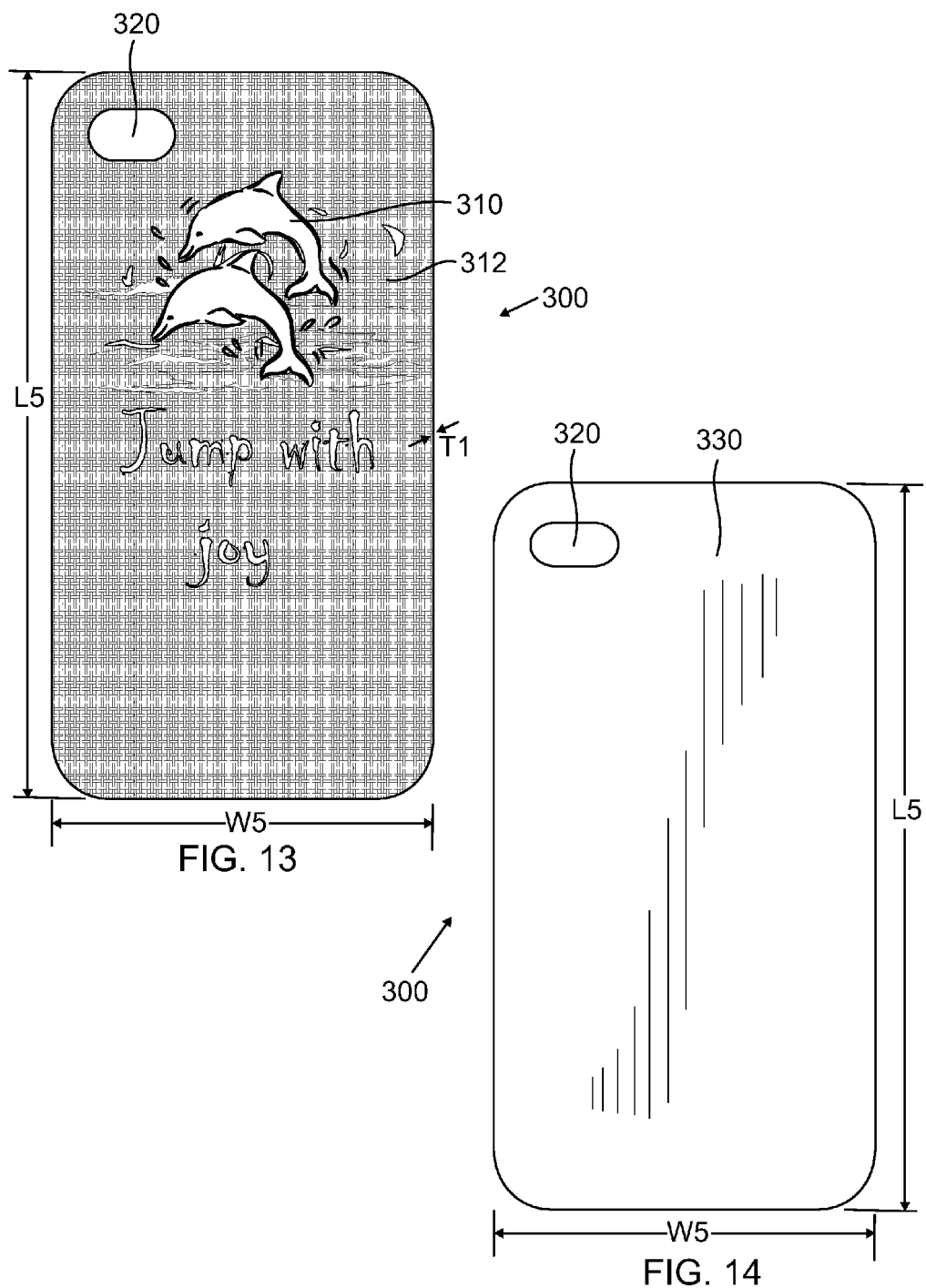
FIG. 13 is a front elevational view of a sketch paper insert used with the present invention cell phone protector case, with a drawing sketch thereon.
FIG. 14 is a rear elevational view of the sketch paper illustrated in FIG. 13.

FIG. 13 is a front elevational view of a sketch paper insert 300 used with the present invention cell phone protector case 10, with a front surface 312 having a drawing sketch 310 thereon. FIG. 14 is a rear elevational view of the sketch paper 300 illustrated in FIG. 13 with a flat rear surface 330. The drawing sketch paper 300 has an opening 320 to match openings 21 and 121. The opening 320 is sized to be a clear cut opening to accommodate a camera opening in the cell phone. The length "L5" and width "W5" are dimensioned to fit into recessed rear wall 42 of cell phone protector case 10 and to be press fit retained by sidewalls 46 and 48 and width-wise walls 50 and 52 and having a thickness "T1" to fit within depth "D1" with the front surface 312 visible from the rear. If the alternative embodiment 110 is used, the transparent snap-on case 210 retains the sketch paper 300 onto the rear wall 142 with the front surface 312 visible from the rear.

FIG. 15 is a front elevational view of a watercolor paper insert 400 used with the present invention cell phone protector case, with a front surface 412 having a watercolor drawing 410 thereon. FIG. 16 is a rear elevational view of the watercolor paper 400 illustrated in FIG. 15 with a flat rear surface 420. The watercolor paper insert 400 has an opening 420 to match opening 21 and 121. The opening 430 is sized to be a clear cut opening to accommodate a camera opening in the cell phone. The length "L6" and width "W6" are dimensioned to fit into recessed rear wall 42 of cell phone protector case 10 and to be press fit retained by sidewalls 46 and 48 and width-wise walls 50 and 52 and having a thickness "T2" to fit within depth "D1" with the front surface 412 visible from the rear. If the alternative embodiment 110 is used, the transparent snap-on case 210 retains the watercolor paper 400 onto the rear wall 142 with the front surface 412 visible from the rear.

FIG. 17 is a front elevational view of a canvas paper insert 500 used with the present invention cell phone protector case, with a front surface 512 having a painting sketch 510 thereon. FIG. 18 is a rear elevational view of the canvas paper illustrated in FIG. 17. The canvas paper insert 500 has an opening 520 to match opening 21 and 121. The opening 520 is sized to be a clear cut opening to accommodate a camera opening in the cell phone. The length "L7" and width "W7" are dimensioned to fit into recessed rear wall 42 of cell phone protector case 10 and to be press fit retained by sidewalls 46 and 48 and width-wise walls 50 and 52 and having a thickness "T3" to fit within depth "D1" with the front surface 512 visible from the rear. If the alternative embodiment 110 is used, the transparent snap-on case 210 retains the canvas paper 500 onto the rear wall 142.

Figure 19:
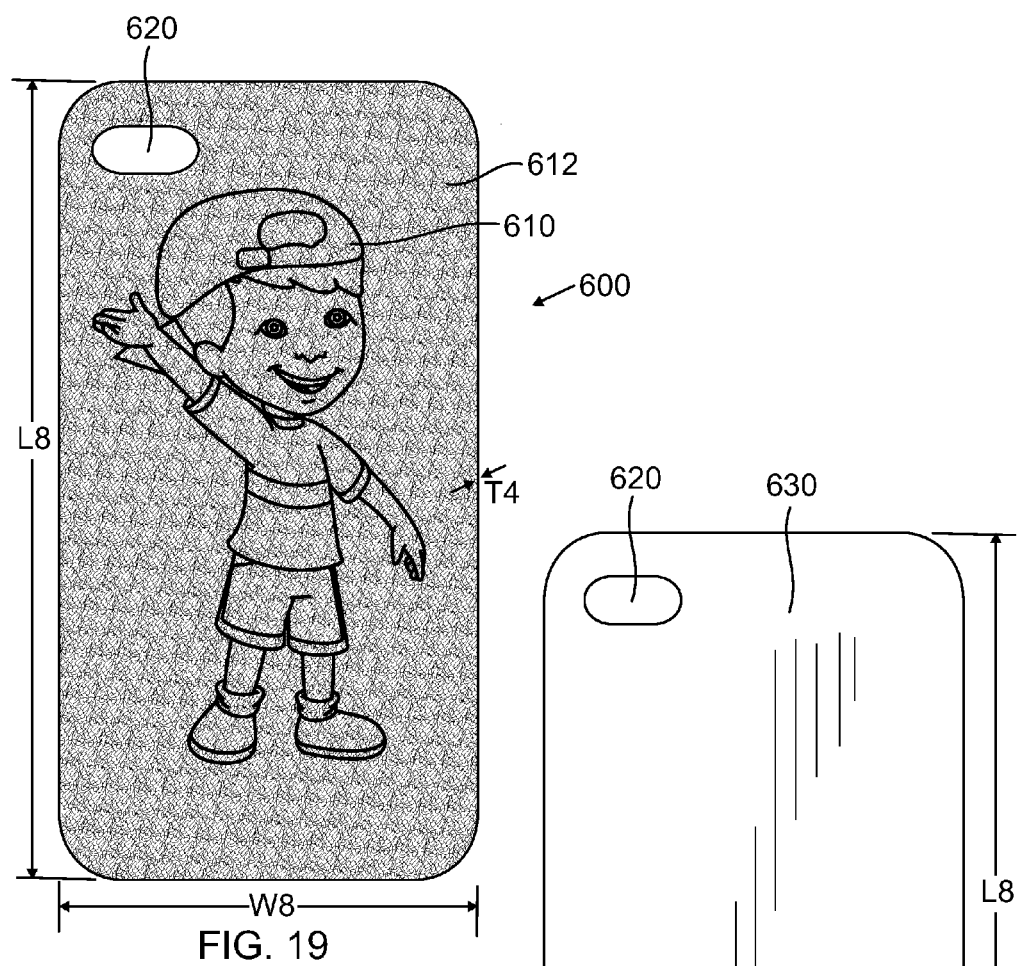
FIG. 19 is a front elevational view of a canvas insert used with the present invention cell phone protector case, with a painting thereon.
Figure 20:
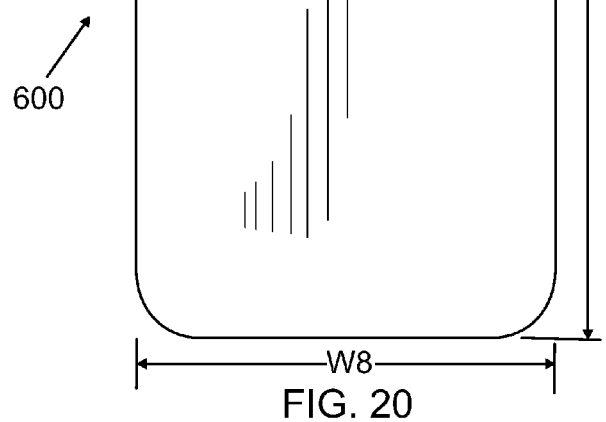
FIG. 20 is a rear elevational view of the canvas illustrated in FIG. 19.

FIG. 19 is a front elevational view of a canvas insert 600 used with the present invention cell phone protector case, with a front surface 612 having painting 610 thereon. FIG. 20 is a rear elevational view of the canvas illustrated in FIG. 19. The canvas insert has an opening 620 to match opening 21 or 121. The opening 620 is sized to be a clear cut opening to accommodate a camera opening in the cell phone. The length "L8" and width "W8" are dimensioned to fit into recessed rear wall 42 of cell phone protector case 10 and to be press fit retained by sidewalls 46 and 48 and width-wise walls 50 and 52 and having a thickness "T4" to fit within depth "D1" with the front surface 612 visible from the rear. If the alternative embodiment 110 is used, the transparent snap-on case 210 retains the canvas 600 onto the rear wall 142 with the front surface visible from the rear.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A cell phone protector case, comprising:
   a. a front interior wall with a first sidewall and a second sidewall, a short first width-wise wall and a short second width-wise wall, the front interior wall, sidewalls and width-wise walls surround a cavity to retain a cell phone;
   b. a rear of the cell phone protector case includes a rear recessed cavity having a recessed rear wall surrounded by a circumferential rim including a first sidewall, a second sidewall, a first width-wise wall and a second width-wise wall, the recessed rear wall having s a width-wise dimension extending an interior of the first sidewall to an interior of the second sidewall and a lengthwise dimension extending from an interior of the first width-wise wall to an interior of the second width-wise wall, and extends for a depth below tops of the respective lengthwise sidewalls and the width-wise walls;
   c. a sheet selected from the group consisting of drawing, sketching or artwork paper having a front surface and a rear surface dimensioned to fit within the rear recessed cavity and retained by the rear sidewalls and rear width-wise walls; and
   d. the sheet of drawing, sketching or artwork paper is a watercolor paper insert facilitating a watercolor drawing on a front surface and having a rear surface, the watercolor paper having a length and width dimensioned to fit into the rear recessed cavity of the cell phone protector case and to be press fit retained by the rear sidewalls and rear width-wise walls and having a thickness to fit within a depth of the rear recessed cavity.

2. A cell phone protector case, comprising:
   a. a front interior wall with a first sidewall and a second sidewall, a short first width-wise wall and a short second width-wise wall, the front interior wall, sidewalls and width-wise walls surround a cavity to retain a cell phone;
   b. a rear of the cell phone protector case includes a rear recessed cavity having a recessed rear wall surrounded by a circumferential rim including a first sidewall, a second sidewall, a first width-wise wall and a second width-wise wall, the recessed rear wall having s a width-wise dimension extending an interior of the first sidewall to an interior of the second sidewall and a lengthwise dimension extending from an interior of the first width-wise wall to an interior of the second width-wise wall, and extends for a depth below tops of the respective lengthwise sidewalls and the width-wise walls;
   c. a sheet selected from the group consisting of drawing, sketching or artwork paper having a front surface and a rear surface dimensioned to fit within the rear recessed cavity and retained by the rear sidewalls and rear width-wise walls; and
   d. the sheet of drawing, sketching or artwork paper is a canvas paper insert facilitating a painting on a front surface and having a rear surface, the canvas paper having a length and width dimensioned to fit into the rear recessed cavity of the cell phone protector case and to be press fit retained by the rear sidewalls and rear width-wise walls and having a thickness to fit within a depth of the rear recessed cavity.

3. A cell phone protector case, comprising:
   a. a front interior wall with a first sidewall and a second sidewall, a short first width-wise wall and a short second width-wise wall, the front interior wall, sidewalls and width-wise walls surround a cavity to retain a cell phone;

b. a rear of the cell phone protector case includes a rear recessed cavity having a recessed rear wall surrounded by a circumferential rim including a first sidewall, a second sidewall, a first width-wise wall and a second width-wise wall, the recessed rear wall having s a width-wise dimension extending an interior of the first sidewall to an interior of the second sidewall and a lengthwise dimension extending from an interior of the first width-wise wall to an interior of the second width-wise wall, and extends for a depth below tops of the respective lengthwise sidewalls and the width-wise walls;

c. a sheet selected from the group consisting of drawing, sketching or artwork paper having a front surface and a rear surface dimensioned to fit within the rear recessed cavity and retained by the rear sidewalls and rear width-wise walls; and d. the sheet of drawing, sketching or artwork paper is a canvas insert facilitating a painting on a front surface and having a rear surface, the canvas having a length and width dimensioned to fit into the rear recessed cavity of the cell phone protector case and to be press fit retained by the rear sidewalls and rear width-wise walls and having a thickness to fit within a depth of the rear recessed cavity.

\* \* \* \* \*